Sept. 21, 1943.  G. F. FERMIER  2,329,751
WEAR RESISTANT BEARING ASSEMBLY
Filed July 21, 1942

George F. Fermier
INVENTOR.
BY
ATTORNEYS

Patented Sept. 21, 1943

2,329,751

UNITED STATES PATENT OFFICE 2,329,751

WEAR RESISTANT BEARING ASSEMBLY

George F. Fermier, Houston, Tex., assignor to Reed Roller Bit Company, Houston, Tex., a corporation of Texas Application July 21, 1942, Serial No. 451,689

6 Claims. (Cl. 308—189)

This invention relates to bearings and has for its general object the provision of bearings which will sustain a greater dead load and at the same time stand up under impact loads better than similar bearings that have been employed in the past.

This invention is particularly applicable for use in bearings for the rolling cutters of drill bits for cutting hard earth formations, such bits being ordinarily referred to as rock bits. It is applicable as well, however, to any situation in which a bearing of limited dimensions is to be subjected to use which will involve very heavy dead loads as well as tremendous impact loads.

In the past, bearings for use such as referred to have been provided, consisting of a shaft having certain desired races thereon for rolling bearings, the cutter or other rotatable member surrounding the shaft and having corresponding races opposed to the races on the shaft, and the rolling bearing members interposed between the shaft and cutter or other rotatable member. Where terrific impact loads are to be expected, as they are in the case of a drill bit for drilling earth formations, the bearing surfaces especially on the rolling members forming parts of the antifriction bearings, cannot be made as hard as they can for a bearing in which only a dead weight or load is to be expected. This is because when the surfaces are made extremely hard, they will break under impact. Bearings so designed with their bearing surfaces softer than the bearing surfaces of a bearing designed for dead weight only, will not crack or break under impact as much as they would if they were made harder, but the softer bearing surfaces will wear much more rapidly than would the harder bearing surfaces and this, of course, greatly shortens the life of a bearing.

It is, therefore, a more specific object of this invention to provide a bearing which will sustain tremendous dead weight loads and will also stand up under impact loads, but which will have more nearly the wearing characteristics of a bearing such as is commonly designed for dead weight loads only.

Other objects and advantages of this invention will become apparent from the following description taken in connection with the accompanying drawing wherein is illustrated by way of example, one embodiment of the invention.

Figure 1:
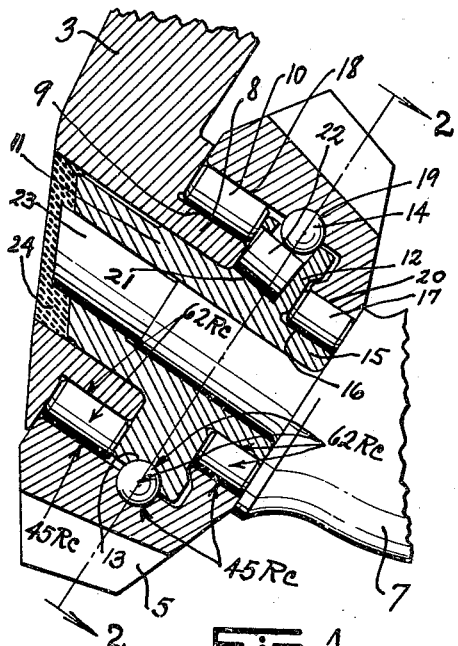
Figure 1 shows a fragmentary cross-section along the axis of rotation of a rolling cutter for a rock bit.

With regard to the structure illustrated in the drawing, the bit body 1 has a threaded shank 2 adapted to receive the lower end of a drill stem or the like to be used in rotating the bit in drilling. This head 1 has downwardly extending side cutter legs 3 and similar downwardly extending cross cutter legs 4. Extending inwardly toward the central axis of the bit from each of the legs 3 is a shaft adapted to provide a rotary mounting for the side cutters 5. Likewise extending inwardly from each of the legs 4 is a shaft providing a rotary mounting for a cross cutter 6. The shafts for receiving the cross cutters may be of any desired form, the form being no part of this invention, but customarily these shafts on which the cross cutters are carried will have their inner ends supported in a bridge member 7 which extends between the inner ends of the shafts on which the side cutters are mounted. For purposes of illustration of the present invention reference will be had to one form of bearing for a side cutter such as the side cutter 5.

Formed on the leg 3 is an annular inwardly extending cylindrical part 8 having a cylindrical race 9 on its outer surface adapted to receive the rollers 10. Into the hollow interior of this cylindrical part 8 there is placed a second cylindrical member 11 having a radially extending flange 12 with a ball race 13 on its outer periphery. This ball race is adapted to receive balls 14. Member 11 also has an annular cylindrical part 15 projecting in the opposite direction from the flange 12 and providing a cylindrical bearing race 16 adapted to receive rollers 17.

The cutter 5 fits over the rollers 10 and 17 and the balls 14, and is provided with a cylindrical part 18 adapted to form a race for the rollers 10, a groove 19 forming a race for the balls 14, and a cylindrical part 20 forming a race for the rollers 17. It may be noted that the flange 12 is provided adjacent its uppermost part with a transverse bore 21 through which the balls 14 may be put in place after the member 11 has been inserted into the cutter. This bore is then closed by means of a plug 22.

After the cutter and the bearings therefore have been put in place as illustrated, the pin 23, which is carried on the bridge 7, is inserted through the member 11 and both the member 11 and the pin 23 are welded in place as indicated at 24. The bridge 7 then serves as an abutment for the inner end of the cutter and prevents the loss of the rollers 17.

The mechanical arrangement forming the bearing which has just been described as well as the bit referred to in connection therewith, form no part of this invention but are used for purposes of illustration only. The present invention has to do with making a bearing which is subjected to service corresponding to the service of the bearing illustrated in such a manner that it will accomplish the objects of the invention. To this end, the present invention contemplates that the bearing surfaces carried on the shaft, including both the member 11 and the cylindrical part 8, will be made relatively much harder than usual for a bearing subjected to this type of service. In fact, those surfaces will be made of the same hardness that they would be for a bearing carrying a dead weight load only. Likewise the surfaces of the rolling bearing members 10, 14, and 17 will be made of the same hardness. Inasmuch as the surfaces just referred to are the ones receiving by far the greatest amount of wear in the bearing, this hardening of the surfaces of these members will greatly increase the wearing characteristics of the bearing.

In order to avoid the situation hereinbefore described in which bearings formed with hard surfaces throughout are likely to be broken under impact, this invention provides a cutter or other rotatable member with bearing surfaces which are much softer even than those at present employed. This makes it possible for the bearing surface within the cutter to take up the shock due to impact and prevent the breaking of the other bearing surfaces by such impacts. At the same time, since the bearing surfaces in the cutters are much larger than the bearing surfaces on the shafts or on the rolling members, they will not be subjected to as much wear and the softer material will therefore be sufficient.

Figure 2:
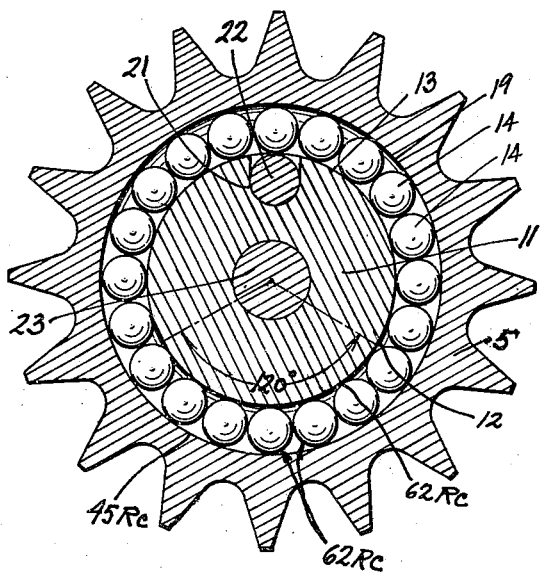
Figure 2 shows a transverse cross-section through the bearing for the same cutter taken along the line 2—2 of Figure 1.
Figure 3:
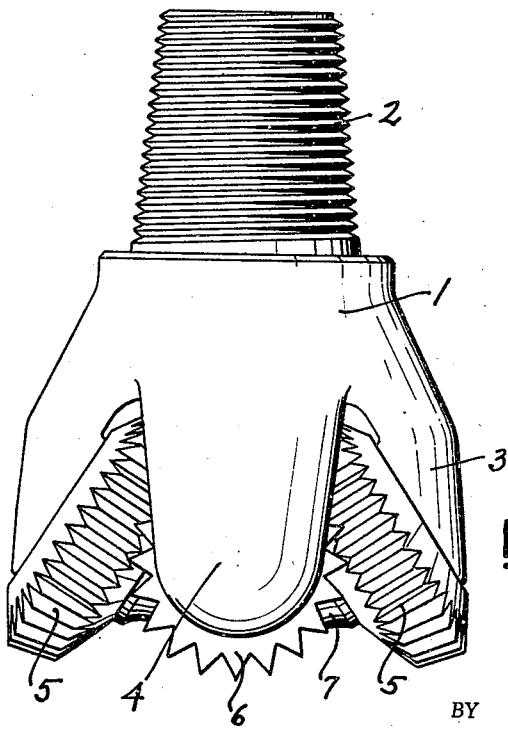
Figure 3 shows a complete rock bit such as that on which the cutter shown in Figures 1 and 2 would be employed.

By way of further explanation, it is to be noted on reference to Figure 2, for example, that the entire radial load on the balls 14 is concentrated on those balls which, at any particular instant, occupy an arc approximately 120 degrees long directly below the central axis of the shaft. This means that substantially all of the weight that is to be placed on this bearing will fall on a relatively small number of balls and will be placed on about one-third of the entire bearing race of the shaft. If excessive wear is not to take place on the balls and on this portion of the race on the shaft, these parts must be made hard. It is contemplated by this invention that whereas the inner races have heretofore been made of a hardness of 60 Rockwell C, this hardness can be increased under the arrangement of the present invention to 62 Rc. In the case of the rollers 10 and 17, these have been made in the past with a hardness approximately 58 Rc, and it is proposed that in accordance with this invention, this be increased to 62 Rc. Likewise, the balls 14 have in the past been made with a hardness approximately 58 Rc and this would, in accordance with the present invention, be increased to approximately 62 Rc.

Only the outer races consisting of those surfaces disposed within the interior of the cutter would be made softer than heretofore, and would be reduced to a hardness of 45 Rc.

The hardnesses indicated will be suitable to enable the bearing to sustain the dead weight loads that will be encountered, and by making the inner races and the rolling bearing members of increased hardness, their wearability will be greatly increased. At the same time, the reduction of the hardness in the outer races within the cutter will still be sufficient to sustain the wear to which this surface will be subjected, because the wear on this surface takes place not through a mere 120 degrees as in the case of the races on the shaft, but throughout the circumference of the cutter. Thus, the races in the cutter will have more than three times the wear surface of the corresponding races on the shaft, and even though they are made softer, they will still wear longer than the bearing surfaces on the shaft. At the same time, making these surfaces within the cutter softer, makes it possible to incorporate into them a sufficient amount of resilience to enable them to serve as shock absorbers under impact loads and prevent the shock from breaking the rolling bearing members or injuring the inner bearing races.

From the foregoing, it will be apparent that this invention will provide a bearing that will be stronger and more wear resistant than the bearings now employed under similar situations, and at the same time, a bearing which will be better able to withstand impact and dead weight loads.

Having described my invention, I claim:

1. In an anti-friction bearing adapted to sustain heavy dead weight and impact loads, a shaft, an annular member rotatably mounted on said shaft, and rolling anti-friction members between said shaft and said annular member, the races on said shaft and the surfaces of said rolling anti-friction members being hard, and the races in said annular member being relatively soft.

2. In an anti-friction bearing adapted to sustain heavy dead weight and impact loads, a shaft, an annular member rotatably mounted on said shaft, and rolling anti-friction members between said shaft and said annular member, the races on said shaft being hard, and the races in said annular member being relatively soft.

3. In an anti-friction bearing adapted to sustain heavy dead weight and impact loads, a shaft, an annular member rotatably mounted on said shaft, and rolling anti-friction members between said shaft and said annular member, the races on said shaft and the surfaces of said rolling anti-friction members being of a hardness of the order of 62 Rc, and the hardness of the race in said annular member being of the order of 45 Rc.

4. In an anti-friction bearing, a shaft, an annular member rotatably mounted on said shaft, and rolling anti-friction members between said shaft and said annular member, the race surfaces on one side of said shaft being hard and the race surfaces in said annular member being relatively soft, whereby said bearings will be adapted to sustain heavy dead weight and impact loads in a direction toward said one side of said shaft and resist wear incident thereto.

5. In an anti-friction bearing, a shaft, an annular member rotatably mounted on said shaft, and rolling anti-friction members between said shaft and said annular member, the race surfaces on one side of said shaft and the surfaces on said rolling anti-friction members being hard and the race surfaces in said annular member being relatively soft, whereby said bearing will be adapted to sustain heavy dead weight and impact loads in a direction toward said one side of said shaft and resist wear incident thereto.

6. In an anti-friction bearing, a shaft, an annular member rotatably mounted on said shaft, and rolling anti-friction members between said shaft and said annular member, the race surfaces on one side of said shaft and the surfaces on said rolling anti-friction members being of a hardness of the order of 62 Rc and the race surfaces in said annular member being of a hardness of the order of 45 Rc, whereby said bearing will be adapted to sustain heavy dead weight and impact loads in a direction toward said one side of said shaft and resist wear incident thereto.

GEORGE F. FERMIER.